(12) United States Patent
Phillips et al.

(10) Patent No.: US 12,241,577 B2
(45) Date of Patent: Mar. 4, 2025

(54) FLUID PIPE CONNECTION

(71) Applicants: AIRBUS OPERATIONS LIMITED, Bristol (GB); AIRBUS OPERATIONS GmbH, Hamburg (DE)

(72) Inventors: Samuel Phillips, Bristol (GB); Ralf Becks, Bristol (GB)

(73) Assignees: AIRBUS OPERATIONS LIMITED, Bristol (GB); AIRBUS OPERATIONS GmbH, Hamburg (DE)

( * ) Notice: Subject to any disclaimer, the term of this patent is extended or adjusted under 35 U.S.C. 154(b) by 37 days.

(21) Appl. No.: 17/896,572

(22) Filed: Aug. 26, 2022

(65) Prior Publication Data
US 2023/0061814 A1  Mar. 2, 2023

(30) Foreign Application Priority Data

Aug. 27, 2021  (GB) ..................................... 2112287

(51) Int. Cl.
*F16L 39/00*  (2006.01)
*F16L 59/18*  (2006.01)

(52) U.S. Cl.
CPC ............. *F16L 39/005* (2013.01); *F16L 59/18* (2013.01); *F16L 2201/20* (2013.01)

(58) Field of Classification Search
CPC ..... F16L 55/18; F16L 2201/20; F16L 39/005; F16L 45/00
See application file for complete search history.

(56) References Cited

U.S. PATENT DOCUMENTS

| 1,466,592 | A | * | 8/1923 | King | F16L 39/005 |
| | | | | | 285/179 |
| 1,497,652 | A | * | 6/1924 | Browne | F16L 39/005 |
| | | | | | 285/123.1 |
| 3,360,001 | A | | 12/1967 | Anderson | |
| 3,482,860 | A | | 12/1969 | Dawbarn et al. | |
| 3,834,341 | A | * | 9/1974 | Sexton | F16L 39/005 |
| | | | | | 440/89 C |

(Continued)

FOREIGN PATENT DOCUMENTS

| AU | 2010203067 A1 | * | 2/2011 | ............. F16L 45/00 |
| DE | 39 36 588 | | 5/1991 | |

(Continued)

OTHER PUBLICATIONS

Combined Search and Examination Report for GB Application No. 2112287.4 dated May 9, 2022, 11 pages.

*Primary Examiner* — Matthew Troutman
*Assistant Examiner* — Fannie Kee
(74) *Attorney, Agent, or Firm* — Nixon & Vanderhye P.C.

(57) ABSTRACT

A fluid pipe connection is disclosed having an inner pipe assembly including a first inner pipe section and a second inner pipe section, and an inner joint between the first inner pipe section and second inner pipe section; an outer pipe assembly having a first outer pipe section, a second outer pipe section, a shroud covering the inner joint and mechanically connecting the first outer pipe section to the second outer pipe section via a mechanical connection, and a hatch fastened to the shroud by one or more fasteners and covering a hole in the shroud, wherein the hatch is moveable between a closed position and an open position to provide access to the inner joint through the hole.

20 Claims, 7 Drawing Sheets

(56) References Cited

U.S. PATENT DOCUMENTS

| | | | | |
|---|---|---|---|---|
| 4,011,732 | A | * | 3/1977 | Doherty ................. F16L 39/005 62/50.7 |
| 4,017,102 | A | * | 4/1977 | Henderson ............ F16L 39/005 285/47 |
| 5,022,685 | A | * | 6/1991 | Stiskin .................. F16L 39/005 285/914 |
| 5,141,256 | A | * | 8/1992 | Ziu ....................... F16L 39/005 285/284.1 |
| 6,848,720 | B2 | | 2/2005 | Carns et al. |
| 10,472,082 | B2 | * | 11/2019 | Leachman ............... F16L 55/18 |
| 2004/0207197 | A1 | * | 10/2004 | Hoang .................. F16L 39/005 285/123.15 |
| 2008/0169037 | A1 | | 7/2008 | Ziegler |
| 2010/0270788 | A1 | * | 10/2010 | Takeda .................... F16L 45/00 285/123.3 |
| 2022/0403968 | A1 | * | 12/2022 | Phillips ................. F16L 39/005 |

FOREIGN PATENT DOCUMENTS

| | | | |
|---|---|---|---|
| EP | 2 265 852 | 12/2010 | |
| FR | 3 068 335 | 1/2019 | |
| KR | 10-1510288 | 4/2015 | |
| KR | 102547991 B1 * | 6/2023 | ............ F16L 39/005 |
| WO | 2004/090405 | 10/2004 | |
| WO | 2009/123299 | 10/2009 | |

\* cited by examiner

FLUID PIPE CONNECTION

CROSS RELATED APPLICATION

This application claims priority to United Kingdom Patent Application GB 2112287.4 filed Aug. 27, 2021, the entire contents of which is hereby incorporated by reference.

FIELD OF THE INVENTION

The present invention relates to a fluid pipe connection, an aircraft fuel system comprising the fluid pipe connection, an aircraft comprising the aircraft fuel system, a method of disassembling the fluid pipe connection, and a method of assembling the fluid pipe connection.

BACKGROUND OF THE INVENTION

Double-walled pipes use a primary inner pipe inside a secondary outer pipe. This insulates a fluid contained within the inner pipe from the ambient temperature surrounding the outer pipe, and creates a fail-safe system that contains any leaked fluid if a failure occurs in the primary pipe.

Installation, access and maintenance of double-walled pipes can be difficult.

SUMMARY OF THE INVENTION

A first aspect of the invention provides a fluid pipe connection, comprising: an inner pipe assembly comprising a first inner pipe section and a second inner pipe section, and an inner joint between the first inner pipe section and second inner pipe section; an outer pipe assembly comprising a first outer pipe section, a second outer pipe section, a shroud covering the inner joint and mechanically connecting the first outer pipe section to the second outer pipe section via a mechanical connection, and a hatch fastened to the shroud by one or more fasteners and covering a hole in the shroud, wherein the hatch is moveable between a closed position and an open position to provide access to the inner joint through the hole.

The hatch covers a hole in the shroud, thereby allowing the inner joint to be accessed through the hole so that inspection, repairs, and replacement of the inner joint and surrounding features can be undertaken. As the mechanical connection across the outer pipe section is maintained when the hatch is in the open position, the inner pipe is always supported by the outer pipe.

The fluid pipe connection may be characterised by the absence of a mechanical connection between the inner pipe assembly and the outer pipe assembly.

The hatch may be detachable from the shroud.

The hatch may be substantially planar.

The fluid pipe connection may comprise an elastomer seal between the shroud and the hatch.

The inner pipe assembly may contain fluid at a temperature below −50 degrees C. The inner pipe assembly may contain fluid at a temperature below −150 degrees C.

The inner pipe assembly may contain gaseous hydrogen.

The inner pipe assembly may contain a cryogenic liquid.

The cryogenic liquid may be liquid hydrogen.

The inner pipe assembly may contain petroleum fuel.

The joint may be between the first inner pipe section, the second inner pipe section, and one or more additional inner pipe sections.

A pressure greater than standard atmospheric pressure may be provided between the inner pipe assembly and the outer pipe assembly. Standard atmospheric pressure may be 101.3 kPa.

The pressure may be greater than 150 kPa.

The fluid pipe connection may comprise an inert gas between the inner pipe assembly and the outer pipe assembly.

The inert gas may be nitrogen.

A vacuum pressure may be provided between the inner pipe assembly and outer pipe assembly.

The vacuum pressure may be less than 3 kPa.

The shroud may be releasably attached to the first outer pipe section and/or the second outer pipe section.

The shroud section may be releasably attached to the first outer pipe section by a mechanical clamp and/or the shroud section may be releasably attached to the second outer pipe section by a mechanical clamp.

The joint between the first inner pipe section and second inner pipe section may be formed by a mechanical clamp. The joint may be disconnectable.

A second aspect of the invention provides an aircraft fuel system comprising the fluid pipe connection of the first aspect.

A third aspect of the invention provides an aircraft comprising the aircraft fuel system of the second aspect.

A fourth aspect of the invention provides a method of disassembling the fluid pipe connection of the first aspect, the method comprising: moving the hatch from the closed position to the open position to uncover the hole in the shroud; and accessing the inner pipe joint via the hole to disassemble the inner pipe joint.

A fifth aspect of the invention provides a method of assembling the fluid pipe connection of the first aspect, the method comprising: assembling the inner pipe assembly by coupling the first inner pipe section to the second inner pipe section; moving the hatch from the open position to the closed position to cover the hole in the shroud.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
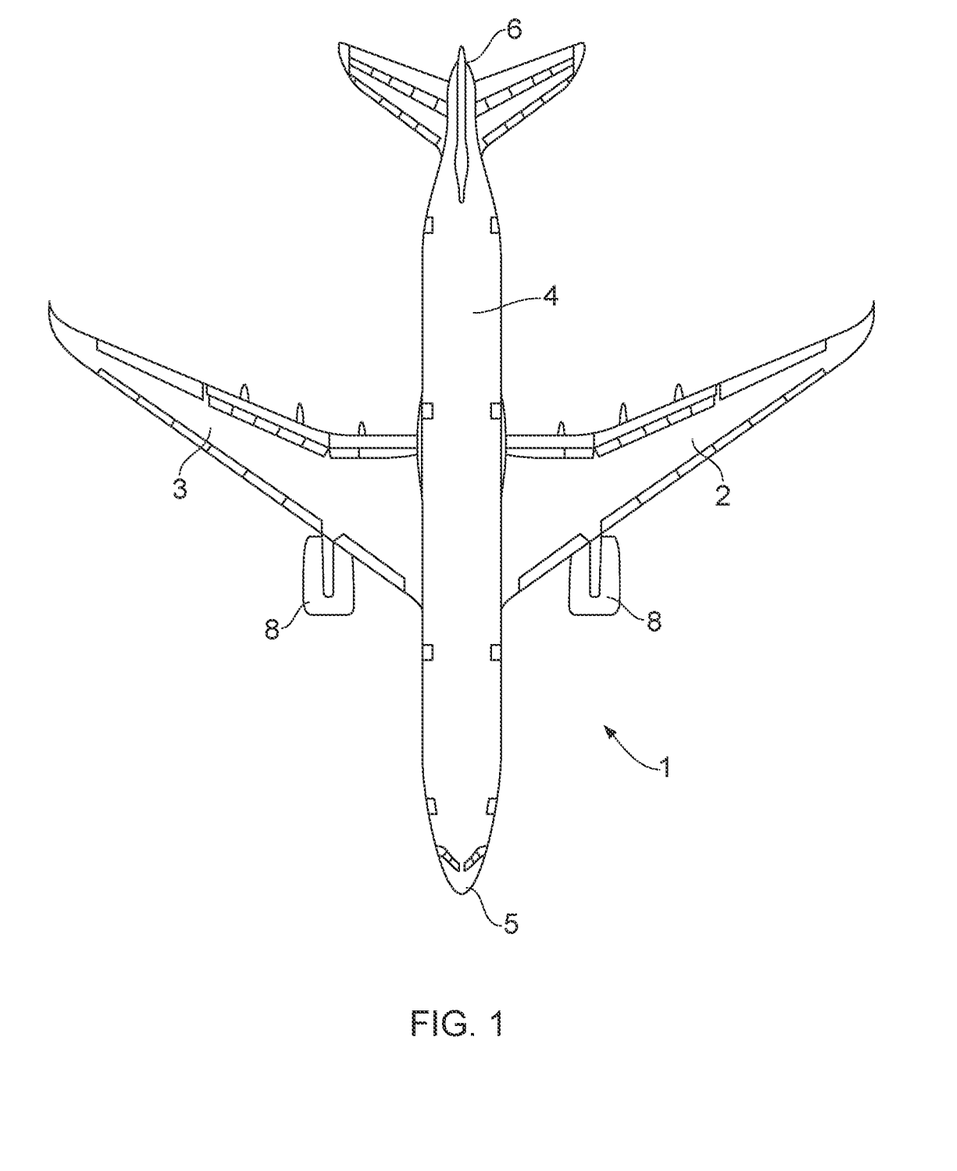
FIG. 1 shows an aircraft.

FIG. 1 shows an existing aircraft 1 with port and starboard fixed wings 2, 3, engines 8, a fuselage 4 with a nose end 5 and a tail end 6. Each wing 2, 3 of the aircraft 1 has a cantilevered structure with a length extending in a span-wise direction from a root to a tip, the root being joined to the aircraft fuselage 4. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

The invention particularly relates to the fuel system of the aircraft, which may deliver fuel from the fuel tanks to the engines 8, or between fuel tanks. The fuel tanks may be in various places on the aircraft 1, for example the wings 2, 3 or in the fuselage 4. Similarly, it will be understood that the engines 8 may be located in any suitable position on the aircraft 1.

Endeavours to reduce emissions and increase aircraft efficiency mean that improvements to existing aircraft are continuously being made, with solutions including the adoption of alternative fuel sources such as gaseous hydrogen and liquid hydrogen.

In some cases, these fuels necessitate particular storage and handling requirements, for example gaseous hydrogen needs low temperatures and high pressures. Liquid hydrogen requires even lower temperature, and even fuels that can be stored at ambient temperatures (e.g. Kerosene and sustainable aviation fuel) require careful handling to prevent leaks. A double-walled fluid pipe construction may be used in such situations.

The fuel is conveyed by fluid pipes that extend between the fuel tanks, or between the fuel tanks and the engines 8, or between the fuel tanks. Maintenance of these fluid pipes is important, but this can be complicated by the competing requirements for storing and handling the fuel and in particular the use of double-walled fluid pipes.

Figure 2:
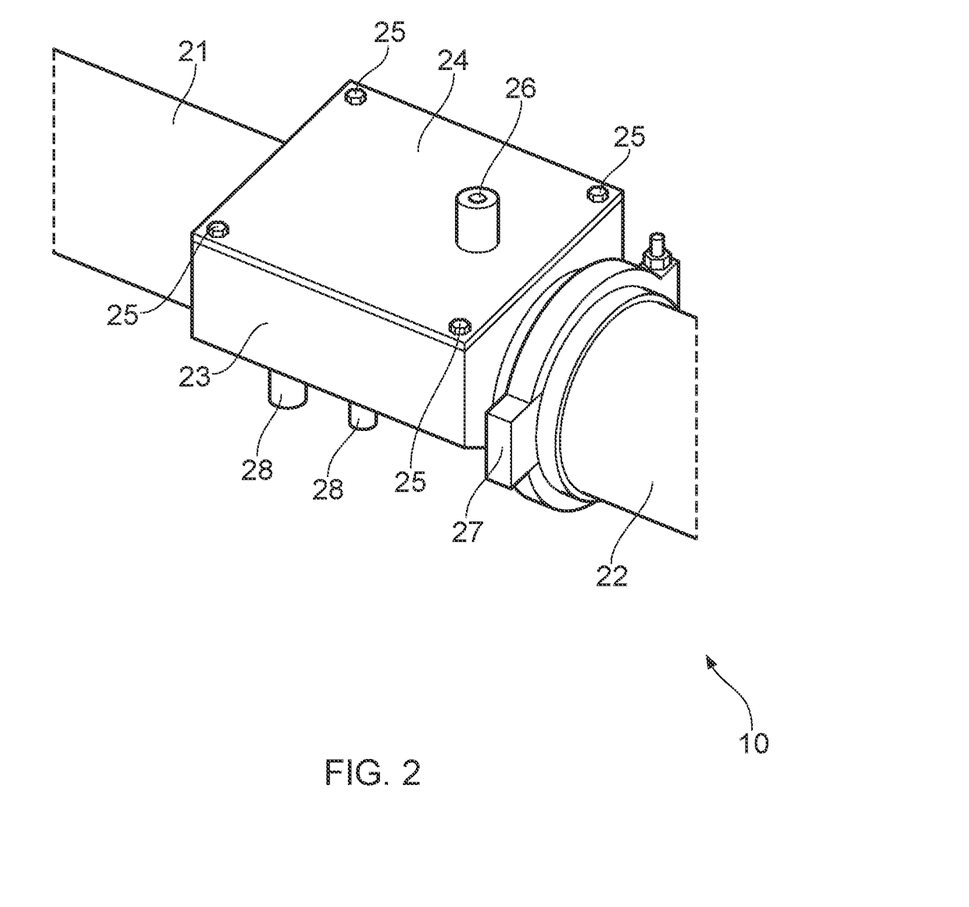
FIG. 2 shows a first example of the fluid pipe connection.

FIG. 2 shows an example of a fluid pipe connection 10 according to a first example. The fluid pipe connection 10 comprises an outer pipe assembly comprising a first outer pipe section 21, a second outer pipe section 22, and a shroud 23 mechanically connecting the first outer pipe section 21 to the second outer pipe section 22 via a mechanical connection.

The shroud 23 may have a larger cross section than the first outer pipe section 21 and the second outer pipe section 22, for example as shown in FIG. 2. The shroud 23 may have a generally square shape, or any other suitable shape for enclosing and allowing access to an inner pipe assembly—as discussed below.

The shroud 23 covers an inner joint 43 of an inner pipe assembly. The shroud 23 includes a hatch 24 arranged to cover a hole in the shroud 23. The hatch 24 is moveable between a closed position, preventing access to the inner joint 43 through the hole, and an open position, providing access to the inner joint 43 through the hole.

The hatch 24 is fastened to the shroud 23 by one or more fasteners 25. The removal of some or all of the fasteners may allow the hatch 24 to be moved from the closed position to the open position. The hatch 24 may be detachable from the shroud 23. For example, removal of the fasteners 25 may detach the hatch 24 from the shroud 23. The fasteners 25 may be screws or bolts or any other suitable fasteners. The fasteners 25 may extend through holes in the hatch 24 so as to connect to the main body of the shroud 23.

The hatch 24 may be substantially planar, as shown in FIG. 2. Substantially planar refers to a hatch 24 that functions as a flat plate in terms of its planar connection to the shroud 23, but may include other features that protrude from or recess into the hatch 24 so that the hatch 24 is not completely flat and smooth. The mechanical connection between the hatch 24 and the main body of the shroud 23 may lie on a plane. The axes of the holes for the fasteners 25 may be parallel to one another.

The hatch 24 may include a vent 26. The vent 26 may allow a parameter of the fluid pipe connection 10 to be monitored by a sensor (as discussed below). Alternatively or in addition, the vent 26 may provide a path for the addition or removal of a gas from the shroud 23.

The hole in the shroud 23 is such that the mechanical connection between the first outer pipe section 21 and second outer pipe section 22 is maintained via the shroud 23 when the hatch 24 is moved from the closed position to the open position, and vice-versa.

The first outer pipe section 21 and second outer pipe section 22 may be releasably attached to the shroud 23 at opposing ends of the shroud 23. The axis of the first outer pipe section 21 may be co-axial with the axis of the second outer pipe section 22.

The first and/or second outer pipe sections 21, 22 may be releasably attached to the shroud 23 by a mechanical clamp 27, such as a v-band clamp. Alternatively, the first and/or second outer pipe sections 21, 22 may be fixedly attached to the shroud 23. For example, the first and/or second outer pipe sections 21, 22 may be welded to the shroud 23.

The shroud 23 may include one or more brackets 28 that are configured to attach the shroud 23 to one or more external structures, such as parts of the airframe.

Figure 3:
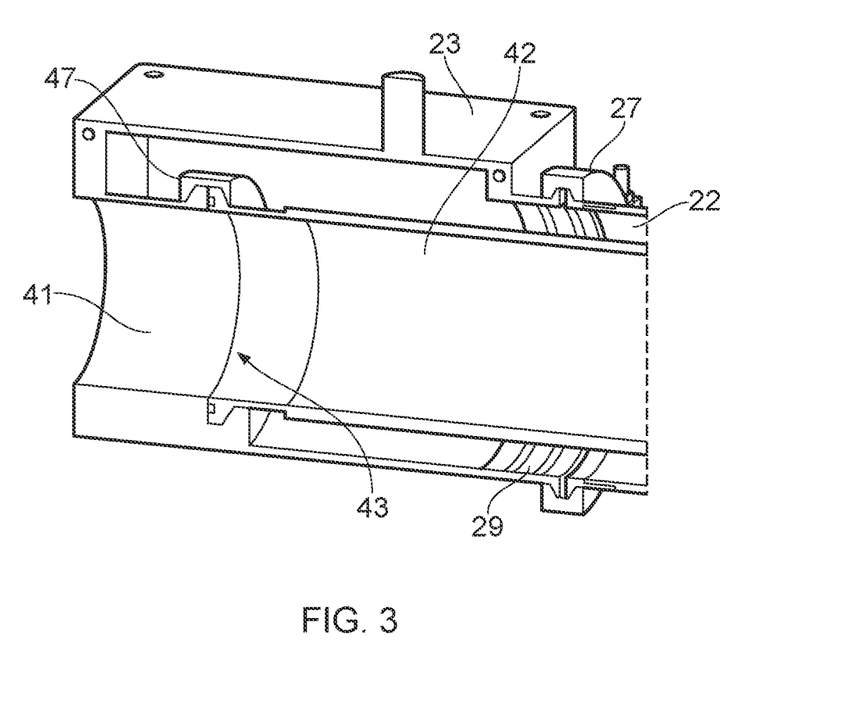
FIG. 3 shows a cross-section across the fluid pipe connection.

FIG. 3 shows a cross-section of the fluid pipe connection 10, showing part of the inner pipe assembly.

The inner pipe assembly comprises a first inner pipe section 41 and a second inner pipe section 42, and an inner joint 43 between the first inner pipe section 41 and second inner pipe section 42. The first inner pipe section 41 and second inner pipe section 42 may directly couple at the inner joint 43, as shown in FIG. 3. The inner joint 43 is enclosed by the shroud 23 when the hatch 24 is in the closed position. The inner joint 43 may be disconnectable, such that the inner joint 43 can selectively attach and detach from the inner pipe sections 41, 42.

The connection (or connections) of the first inner pipe section 41 and second inner pipe section 42 at the inner joint 43 is contained within the shroud 23, so that removal of the hatch 24 allows access to the inner joint 43 and the connection. As such, the connections between the first and second outer pipe sections 21, 22 to the shroud 23 are offset from the connection of the inner pipe sections 41, 42.

Figure 4:
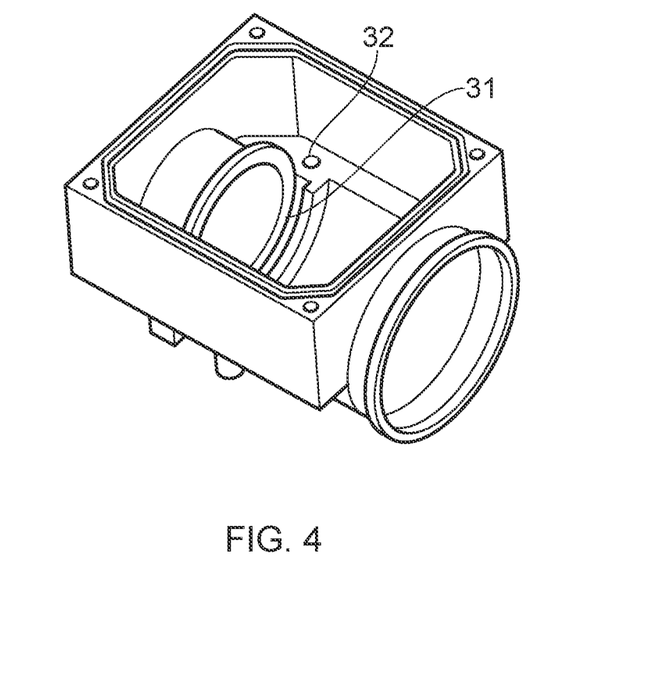
FIG. 4 shows a perspective view of the fluid pipe connection with the hatch removed.

A mechanical connection may be present between the inner pipe assembly and the outer pipe assembly, so as to support the inner pipe assembly, outer pipe assembly, or both. As shown in FIG. 3, an inner surface of the shroud 23 may support the inner joint 43. A recess 31 may be formed in the shroud 23, for example as shown in FIG. 4, which forms a contact area between the inner joint 43 and the shroud 23 that supports an end of the first inner pipe section 41 and an end of the second inner pipe section 42. The recess 31 may support a portion of the circumference of the inner joint, for example a semi-circular portion of the inner joint—as shown in FIG. 4.

The first inner pipe section 41 and the second inner pipe section 42 may be releasably attached to each other. For example, the first inner pipe section 41 and the second inner pipe section 42 may be releasably attached by a mechanical clamp 47. In some cases, for example where the inner surface of the shroud 23 circumferentially contacts and supports a portion of the inner joint 43, the mechanical clamp 47 may extend only partially around the inner joint 43. In other examples, a gap may be provided between the inner surface of the shroud 23 and the inner joint 43, such that a mechanical clamp 47 extends around the entire circumference of the inner joint. The mechanical clamp may be a v-band clamp.

FIG. 4 shows a fastener hole 32 for attaching one end of a mechanical clamp 47 to the shroud 23, and thereby holding the inner joint 43 between the shroud 23 and the mechanical clamp 47.

FIG. 3 shows the second outer pipe section 22 releasably attached to the shroud 23 by a mechanical clamp 27. To facilitate this connection, the shroud 23 may include a protrusion 29 onto which the mechanical clamp 27 is connectable.

The first outer pipe section 21 may be fixedly attached to the shroud 23, for example by welding the first outer pipe section 21 to the shroud 23.

To access the inner pipe joint 43, the fasteners 25 are removed from the hatch 24 and the hatch 24 is detached from the main body of the shroud 23. As such, the hatch 24 is moved from the closed position to the open position. In the open position, the inner pipe joint 43 is accessible via the hole in the shroud 23. The inner pipe joint 43 may be disassembled so as to decouple the first inner pipe section 41 from the second inner pipe section 42.

To assemble the fluid pipe connection, the inner pipe assembly is assembled by coupling the first inner pipe section 41 to the second inner pipe section 42. The hatch 24 may be moved from the open position, wherein the hatch 24 is detached from the main body of the shroud 23, to the closed position, wherein the fasteners 25 attach the hatch 24 to the shroud 23.

The first inner pipe section 41 and second inner pipe section 42 may be directly coupled. Alternatively, the first inner pipe section 41 and second inner pipe section 42 may be indirectly coupled via the shroud 23 (as shown in FIG. 3) or via an additional inter-connector.

The inner and outer pipe assemblies may be made of any suitable metal, such as stainless steel, titanium, or aluminium. Alternatively, certain parts of the pipe assemblies, such as the outer pipe sections 21, 22 and/or the inner pipe sections 41, 42 may be a hose made of a flexible material, such as elastomer. A flexible hose can allow a longer length of inner pipe to be used, thereby reducing the number of couplings and fittings required along its length so that there is less flow resistance.

The inner pipe assembly is configured to carry a fluid. The fluid may be gaseous hydrogen arranged to power one or more engines 8 of the aircraft 1. The gaseous hydrogen in the inner pipe assembly may be maintained at high pressure, for example at around 500 kPa (5 bars). The gaseous hydrogen in the inner pipe assembly may be maintained at low temperature, for example between −55 degrees Celsius and −85 degrees Celsius.

The outer pipe assembly may provide several benefits to the fluid pipe assembly.

The outer pipe assembly may act as a secondary barrier to ensure any leaks from the inner pipe assembly, and in particular the inner pipe joint 43, are contained within the outer pipe assembly. The outer pipe assembly may also create a thermal barrier, firstly via the outer pipe assembly itself, and secondly the interspace between the outer pipe assembly and the inner pipe assembly.

In some examples, the interspace between the inner and outer pipe assemblies may contain an inert gas, for example nitrogen. This may help to prevent an accumulation of oxygen and hydrogen in the interspace in the event of a leak from the inner pipe assembly. Such an accumulation may result in a built up of water. The inert gas in the interspace may be kept at a pressure greater than standard atmospheric pressure, for example greater than 150 kPa (1.5 Bars). The pressure may be at around 200 kPa (2 Bars).

The interspace is continuous across the fluid pipe connection 10, such that the interspace extends continuously from the first inner pipe section 41 to the second inner pipe section 42, and from the first outer pipe section 21 to the second outer pipe section 22. In addition to reducing mechanical contact between the inner and outer pipe assemblies, this also allows a single source of inert gas to be used to insulate the fluid pipe connection 10.

The fluid pipe connection may comprise a sensor (not shown) configured to measure a parameter of the fluid pipe connection, for example to detect a leak. The sensor may be a pressure sensor configured to monitor a pressure between the inner pipe assembly and the outer pipe assembly, and thereby measure any pressure increase in the interspace, e.g. as a result of a leak in the inner pipe assembly or outer pipe assembly. The pressure sensor may monitor a pressure change of the inert gas.

The interspace may comprise insulation in addition or instead of an inert gas.

The outer pipe assembly acts as an insulating barrier between the inner pipe assembly and the surrounding atmosphere that can assist in maintaining the gaseous hydrogen at low temperature.

It may therefore be beneficial to limit mechanical connection between the inner pipe assembly and the outer pipe assembly. For example, FIG. 3 shows the absence of a mechanical connection between the second outer pipe section 22 and the second inner pipe section 42.

Figure 5:
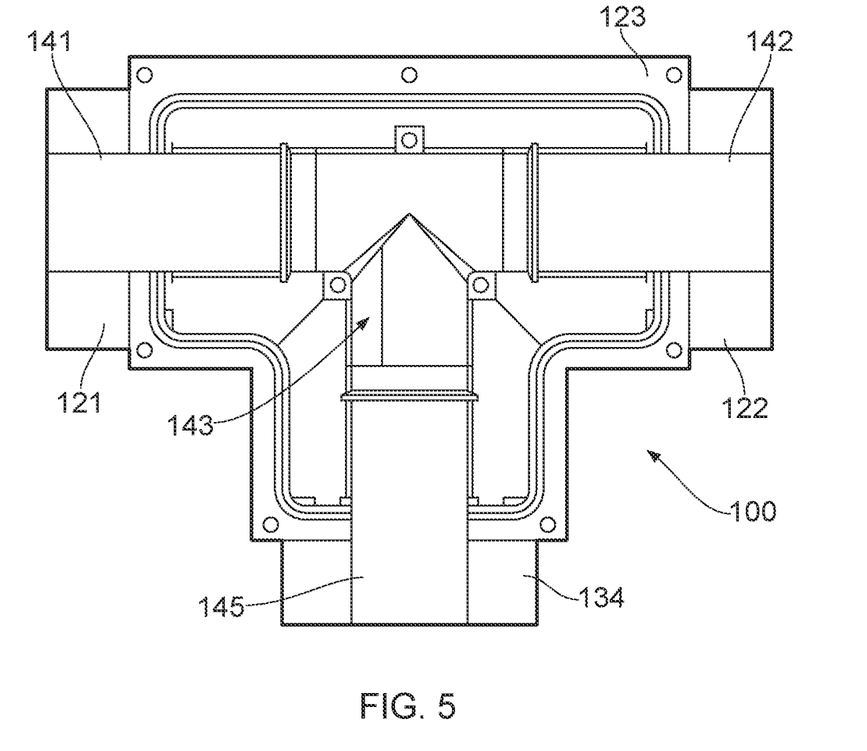
FIG. 5 shows a top view of a second example of a fluid pipe connection.

FIG. 5 shows an example of a fluid pipe connection 100 according to a second example. The fluid pipe connection 100 of the second example is similar to the first example and includes many features in common with the fluid pipe connection 10 of the first example but numbered in the 100 series.

The fluid pipe connection 100 comprises an outer pipe assembly comprising a first outer pipe section 121, a second outer pipe section 122, and a shroud 123 mechanically connecting the first outer pipe section 121 to the second outer pipe section 122 via a mechanical connection.

The outer pipe assembly further comprises an additional (third) outer pipe section 134 mechanically connected to the first and second outer pipe sections 121, 122 via the shroud 123.

Figure 6:
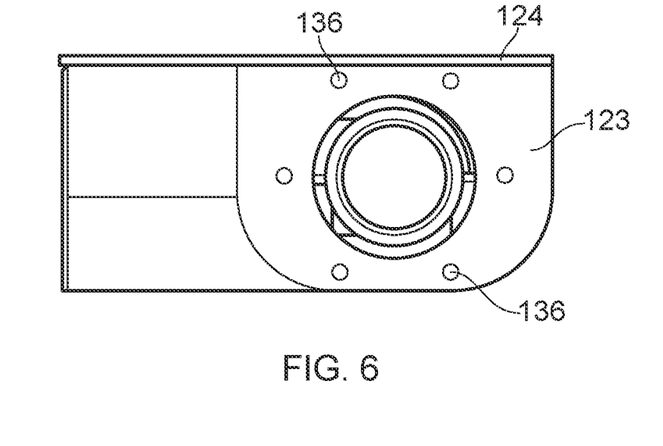
FIG. 6 shows a side view of the fluid pipe connection.

As in the first example, the shroud 123 covers the inner joint 143 of an inner pipe assembly. The shroud 123 includes a hatch 124 arranged to cover a hole in the shroud 123, as shown in FIG. 6. The hatch 124 is moveable between a closed position, preventing access to the inner joint 143 through the hole, and an open position, providing access to the inner joint 143 through the hole.

The hatch 124 is similar to the hatch 24 of the first example, in that the inner joint 143 (comprising the first inner pipe section 141, second inner pipe section 142, and an additional (third) inner pipe section 145) is enclosed by the shroud 123 when the hatch 24 is in the closed position. In this example, the inner joint 143 is a T-section of pipe, although it will be clear that two or more of the pipes 141, 142, 145 of the inner joint 143 may be directly connected to one another.

To access the inner pipe joint 143, fasteners (e.g. fasteners 25) are removed from the hatch 124 and the hatch 124 is detached from the main body of the shroud 123. As such, the hatch 124 is moved from the closed position to the open position. In the open position, the inner pipe joint 143 can be accessed via the hole in the shroud 123. The inner pipe joint 143 may be disassembled so as to decouple the inner pipe sections 141, 142, 145 or otherwise inspect the inner pipe joint 143. The inner pipe sections 141, 142, 145 may be coupled to the inner pipe joint 143 (or to one another) by mechanical clamps 147, such as v-band clamps (See FIG. 7).

The hole in the shroud 123 is such that the mechanical connection between each of the outer pipe sections 121, 122, 134 is maintained via the shroud 123 when the hatch 124 is moved from the closed position to the open position, and vice-versa.

Figure 7:
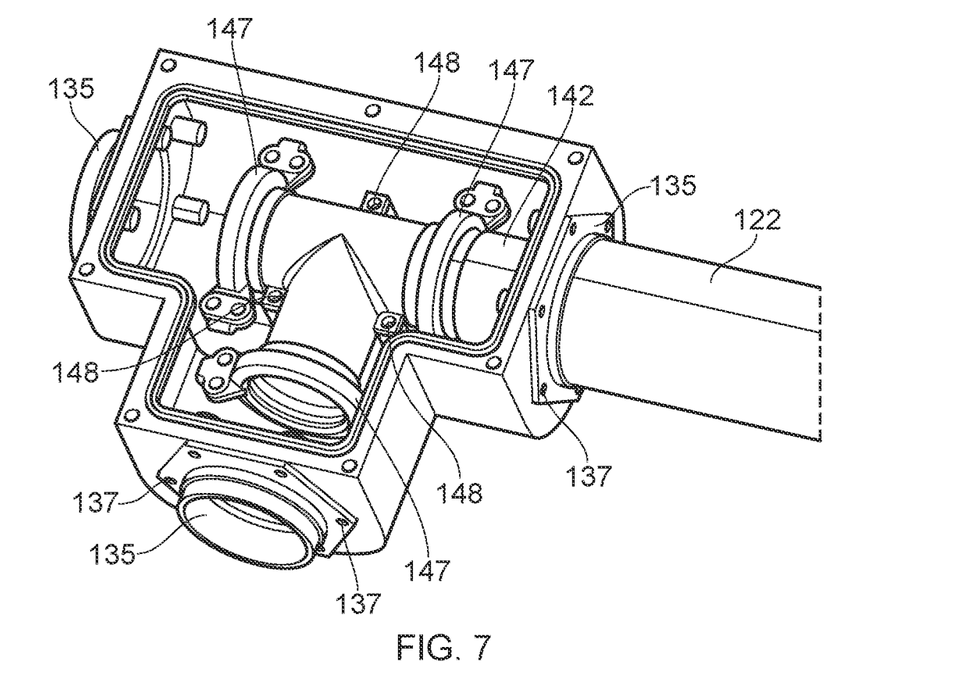
FIG. 7 shows a perspective view of the fluid pipe connection.

The outer pipe sections 121, 122, 134 may be releasably attached to the shroud 123, for example by a mechanical clamp 147 such as a v-band clamp. Alternatively, the outer pipe sections 121, 122, 134 may be fixedly attached to the shroud 123. For example, the outer pipe sections 121, 122, 134 may be welded to the shroud 123. Alternatively, or in addition, flanges 135 may assist in attaching the outer pipe sections 121, 122, 134 to the shroud 123, as shown in FIG. 7. The flanges 135 may be coupled to the shroud 123 by fasteners (not shown). FIG. 6 shows holes 136 in the shroud 123, and FIG. 7 shows holes 137 in the flanges 135, that the fasteners may extend through to attach the flanges 135 to the shroud 123. Alternatively, the flanges 135 may be welded to the shroud 123. The flanges 135 may provide a surface for attaching a mechanical clamp (such as a v-band clamp) to the outer pipe sections 121, 122, 134 or welding to the outer pipe sections 121, 122, 134.

The shroud 123 may include one or more brackets that are configured to attach the shroud 123 to one or more external structures, such as parts of the airframe. For example, brackets 28 shown in relation to the first example.

Figure 8:
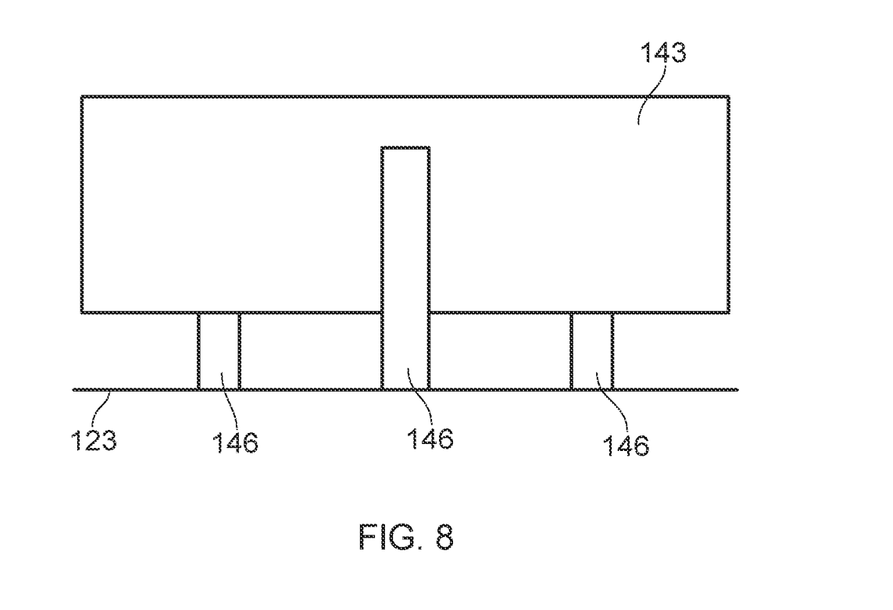
FIG. 8 shows a cross-section view of the fluid pipe connection showing a mechanical connection between the inner pipe joint and the shroud.

The inner pipe joint 143 may be connected to the shroud 123 by one or more columns 146. The columns 146 may extend between the inner pipe joint 143 and the shroud 123. The columns 146 reduce physical connection between the inner pipe joint 143 and the shroud 123 and thereby help to insulate the inner pipe joint 143 and the inner pipe sections 141, 142, 145. FIG. 8 shows a cross-sectional view of the shroud 123 showing an example of the mechanical connection between the inner pipe joint 143 and the shroud 123 formed by the columns 146. The columns may be integral with the shroud 123. The columns 146 may have a substantially constant cross-sectional area. The columns 146 may contact the shroud 123 at a first end and contact the inner pipe joint 143 at a second end that opposes the first end. The inner joint 143 may be coupled to the columns 146 by fasteners 148, as shown in FIG. 7.

Figure 9:
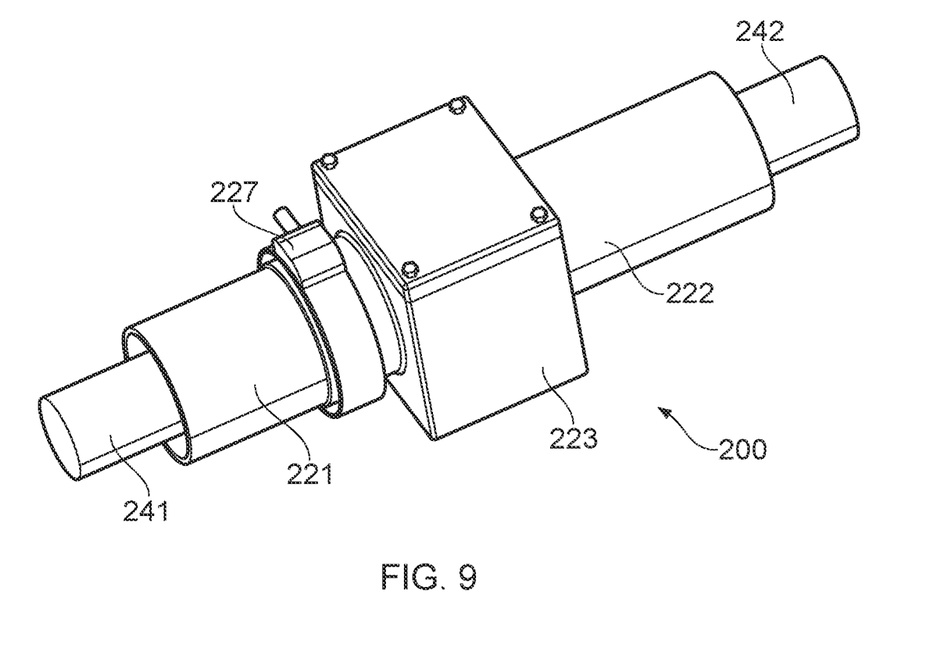
FIG. 9 shows a third example of a fluid pipe connection.

FIG. 9 shows a third example of a fluid pipe connection 200. The fluid pipe connection 200 of the third example is similar to the first and second examples and includes many features in common with the first and second examples but numbered in the 200 series.

The fluid pipe connection 200 of the third example comprises an outer pipe assembly comprising a first outer pipe section 221, a second outer pipe section 222, and a shroud 223 mechanically connecting the first outer pipe section 221 to the second outer pipe section 222 via a mechanical connection.

Figure 10:
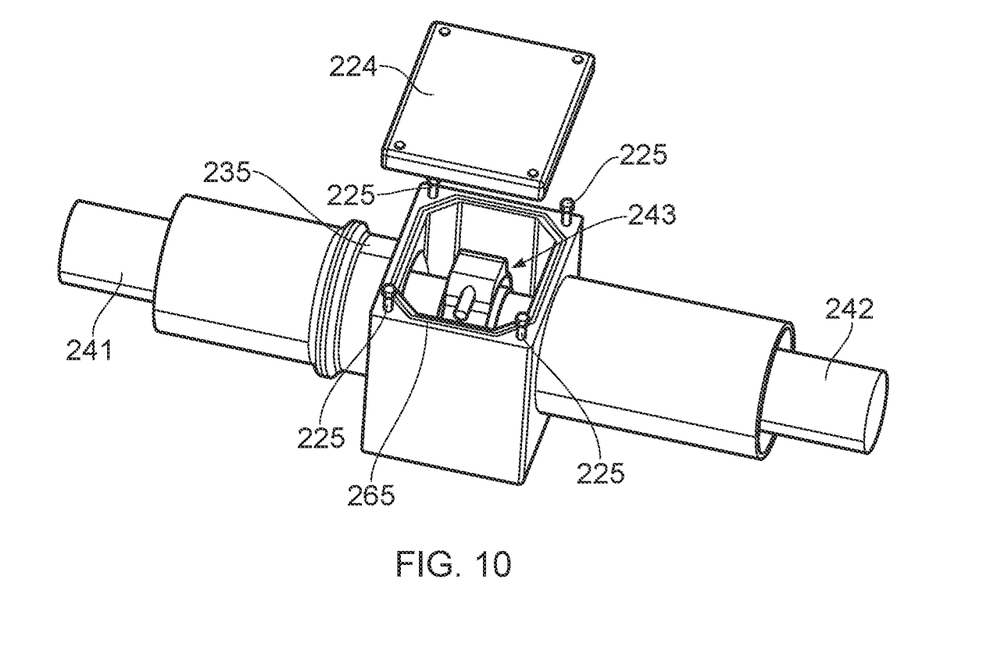
FIG. 10 shows the fluid pipe connection with the hatch removed.

The shroud 223 covers an inner joint 243 of an inner pipe assembly, as shown in FIG. 10. The shroud 223 includes a hatch 224 arranged to cover a hole in the shroud 223. The hatch 224 is moveable between a closed position, preventing access to the inner joint 243 through the hole, and an open position, providing access to the inner joint 243 through the hole.

The hatch 224 is fastened to the shroud 223 by one or more fasteners 225. The removal of some or all of the fasteners 225 may allow the hatch 224 to be moved from the closed position to the open position. The hatch 224 may be detachable from the shroud 223. For example, removal of the fasteners 225 may detach the hatch 224 from the shroud 223. The fasteners 225 may be screws or bolts or any other suitable fasteners. The fasteners 225 may extend through holes in the hatch 224 so as to connect to the main body of the shroud 223.

As in the previous examples, the hatch 224 may be substantially planar, for example as shown in FIG. 10. The mechanical connection between the hatch 224 and the main body of the shroud 223 may lie on a plane. The axes of the holes for the fasteners 225 may be parallel to one another.

When the hatch 224 is moved from the closed position to the open position, and vice-versa, the hole in the shroud 223 is such that a mechanical connection between the first outer pipe section 221 and second outer pipe section 222 is maintained via the shroud 223. The hatch 224 may be spaced from the outer pipe sections 221, 222 such that the hatch 224 does not directly connect to the outer pipe sections 221, 222.

The first outer pipe section 221 and/or the second outer pipe section 222 may be releasably attached to the shroud 223 by a mechanical clamp 227, such as a v-band clamp. Alternatively, the first outer pipe section 221 and/or the second outer pipe section 222 may be welded or otherwise fixedly attached to the shroud 223. FIGS. 9 & 10 show the first outer pipe section 221 releasably attached to the shroud 223 by a v-band clamp 227 and the second outer pipe section 222 fixedly attach to the shroud 223 by welding it to the shroud 223.

The inner pipe assembly may be similar to that shown in the earlier examples.

In FIG. 10, the inner pipe assembly is shown to comprise a first inner pipe section 241 and a second inner pipe section 242, and an inner joint 243 between the first inner pipe section 241 and second inner pipe section 242. However it will be appreciated that the inner pipe assembly may comprise any number of inner pipe sections 241, 242, such as the three pipe sections shown in the second example of FIGS. 5-8.

The first inner pipe section 241 and second inner pipe section 242 may directly couple at the inner joint 243, as shown in FIG. 10, or may include a connector separating the pipe sections 241, 242, as shown in the second example of FIGS. 5-8.

The first inner pipe section 241 and the second inner pipe section 242 may be releasably attached to each other. For example, the first inner pipe section 241 and the second inner pipe section 242 may be releasably attached by a mechanical clamp 247. The mechanical clamp may be a v-band clamp.

FIGS. 9 & 10 show the first outer pipe section 221 releasably attached to the shroud 223 by a mechanical clamp 227. To facilitate this connection, the shroud 223 may include a flange 235 onto which the mechanical clamp 227 is connectable.

As in the first and second examples, the inner pipe joint 243 is accessed by removing the fasteners 225 from the hatch 224. This releases the hatch 224 from the shroud 223.

The fluid pipe connection 200 is arranged to carry a fluid. The fluid may be a cryogenic liquid such as liquid hydrogen. The liquid hydrogen may be arranged to power one or more engines 8 of the aircraft 1.

Liquid hydrogen requires storage at cryogenic temperatures to maintain it in a liquid form. The temperature may be less than −150 degrees Celsius, and more preferably below −250 degrees Celsius.

In order to increase insulation across the inner and outer pipe sections, there may be an absence of a mechanical connection between the inner pipe assembly and the outer pipe assembly. The absence of mechanical connection between the inner pipe assembly and the outer pipe assembly at the fluid pipe connection 200 avoids significant conductive heat transfer at the pipe connection 200.

Figure 12:
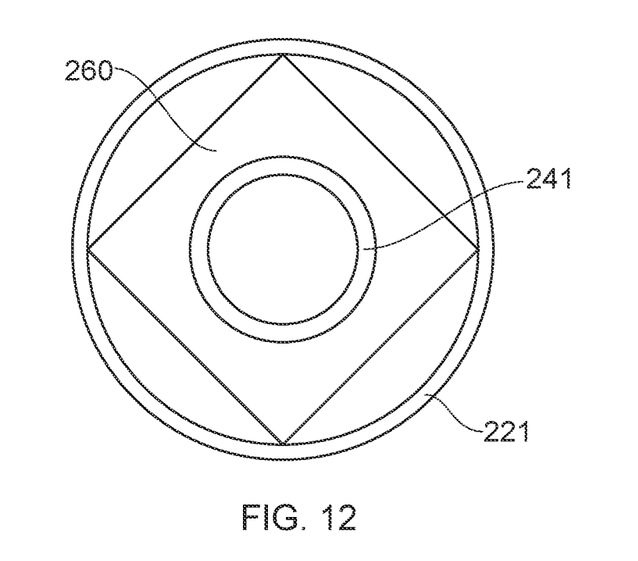
FIG. 12 shows a spacer between an inner pipe section and an outer pipe section.

To maintain the coaxial arrangement between the inner pipe assembly and the outer pipe assembly, non-metallic spacers 260 may be fitted in the interspace between respective inner pipes 241, 242 and outer pipes 221, 222 at a location remote from the fluid pipe connection 200. An example of such a spacer 260 between the first inner pipe section 241 and first outer pipe section 221 is shown in FIG. 12.

The spacer 260 may be square, with four points of contact with the outer pipe 221, 222, so it does not block the flow along the interspace and has minimal conductive thermal connection with the outer pipe section 221, 222. The spacer 260 may be fixed to the inner pipe section 241, 242, and has a sliding connection with the outer pipe section 221, 222.

A number of such spacers 260 may be provided on either side of the fluid pipe connection 200, but these may be spaced some distance from the fluid pipe connection 200 so as to ensure the absence of a mechanical connection between the inner pipe assembly and the outer pipe assembly at the fluid pipe connection 200.

A vacuum pressure may be provided in the space between the inner pipe assembly and outer pipe assembly. The vacuum pressure helps to avoid heat transfer between the pipe assemblies, and thereby helps to insulate the liquid hydrogen in the inner pipe assembly. The vacuum pressure may be less than 3 kPa, preferably less than 0.5 kPa, and more preferably less than 0.2 Pa.

Figure 11:
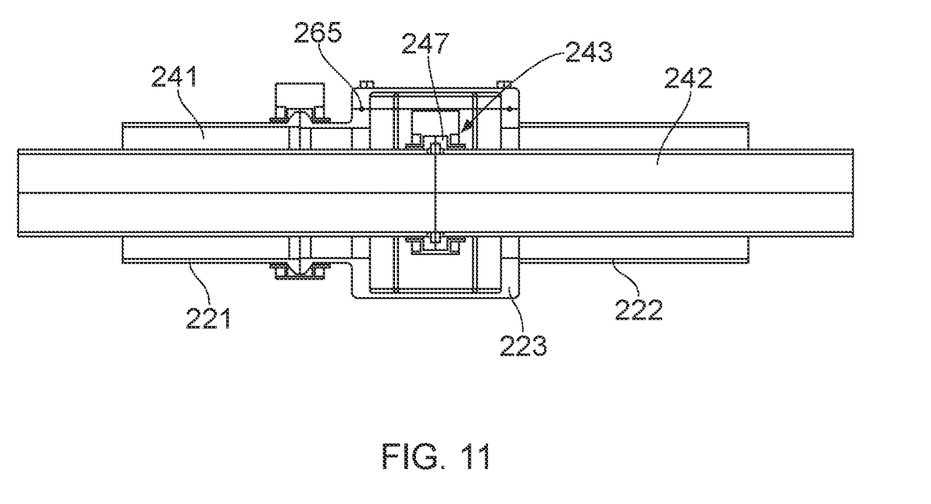
FIG. 11 shows a cross-section across the fluid pipe connection.

One or more elastomer seals 265 may be provided between the shroud 223 and the hatch 224. This assists in providing an air-tight boundary between the outer atmosphere and the shroud 223 (i.e. the interspace between the inner and outer pipe assemblies). A second elastomer seal 265 may be provided as a redundancy, in the event the first elastomer seal 265 is damaged or rendered sub-optimally effective due to the cold temperatures experienced. The first elastomer seal 265 may be positioned between the shroud 223 and the second elastomer seal 265, so as to protect the second elastomer seal 265 from the cold temperatures inside the shroud 223. The first and/or second elastomer seals 265 may be provided in a recess formed in the shroud 223 and/or hatch 224, for example as shown in FIG. 11.

The shroud 223 may include one or more brackets that are configured to attach the shroud 223 to one or more external structures, such as parts of the airframe. For example, brackets 28 shown in relation to the first example.

The inner and outer pipe assemblies may be made of any suitable metal, such as stainless steel, titanium, or aluminium. Preferably the inner and/or outer pipe assemblies are made of steel.

It will be clear to the skilled person that many of the features described in relation to each example can be appropriately combined with the features of other examples.

Each of the described examples may have any number of inner and outer pipe sections, for example two, three or four inner pipe sections meeting at an inner joint 43, 143, 243 and/or two, three or four outer pipe sections coupled to the shroud 23, 123, 223. In some examples, there may be a different number of inner and outer pipe sections. For example, one of the outer pipe sections may be a supply line for an inert gas supply or vacuum supply.

Any of the examples may include spacers 260 to maintain the coaxial arrangement between the inner pipe assembly and the outer pipe assembly, and/or one of more elastomer seals 265 between the shroud 223 and the hatch 224. The elastomer seal 265 may be a vacuum seal.

Each of the examples may also comprise the absence of a mechanical connection between the inner pipe assembly and the outer pipe assembly, or a column 146 that extends between the inner pipe joint 43, 143, 243 and the shroud 23, 123, 223 that reduces physical connection between the inner pipe joint 43, 143, 243 and the shroud 23, 123, 223.

The interspace may be continuous across the fluid pipe connection 10, 100, 200, such that the interspace extends continuously from the first inner pipe section 41, 141, 241 to the second inner pipe section 42, 142, 242, and from the first outer pipe section 21, 121, 221 to the second outer pipe section 22, 122, 222. In addition to reducing mechanical contact between the inner and outer pipe assemblies, this also allows a single source of inert gas to be used to insulate the fluid pipe connection.

The hatch 24, 124, 224 in the examples is fastened to the shroud 23, 123, 223 by one or more fasteners 25, and the removal of the fasteners allows the hatch 24 to be moved from the closed position to the open position by detaching the hatch 24, 124, 224 from the shroud 23, 123, 223. Alternatively, the hatch 24, 124, 224 may be coupled to the shroud 23, 123, 223 by a hinge, such that the hatch 24, 124, 224 remains attached to the shroud 23, 123, 223 in the open position. The hinge may be rotatable about a hinge axis.

The first example is said to comprise a sensor configured to measure a parameter of the fluid pipe connection, for example to detect a leak. However, it will be clear that a sensor may be used in combination with any of the disclosed examples. The sensor may be a pressure sensor configured to monitor a pressure between the inner pipe assembly and the outer pipe assembly, or any other type of sensor suitable for measuring a parameter of the fluid pipe connection (e.g. temperature). The sensor may measure a pressure change of the vacuum.

The hatch 24 of the first example is shown to include a vent 26, however it will be appreciated that any of the described examples may include a vent 26.

The examples have been described in relation to a fluid pipe connection 10, 100, 200 for gaseous and liquid hydrogen, however it will be clear the fluid pipe connection 10, 100, 200 has many other suitable applications. The inner pipe assembly may contain water or petroleum fuel. The fluid pipe connection 10, 100, 200 may carry sustainable aviation fuel (SAF) or kerosene, or any other suitable fuel or fluid. In one example, the fluid pipe connection conveys liquid kerosene fuel from a fuel tank to an auxiliary power unit (APU) in the fuselage.

The fluid pipe connection 10, 100, 200 may provide leak prevention, such that any fuel or other fluid leaked from the inner pipe assembly is captured by the outer pipe assembly.

The fluid pipe connections 10, 100, 200 may be part of the fuel system of the aircraft 1 located in the wings 2, 3 and/or in the fuselage 4 of the aircraft.

The examples have been disclosed in context of an aircraft 1, however the fluid pipe connection 10, 100, 200 may be used in a number of different applications in addition to an aircraft system. For example, the fluid pipe connection 10, 100, 200 may be used in a laboratory environment, in an automobile or on a train.

Where the word or appears this is to be construed to mean and/of such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A fluid pipe connection, comprising:
   an inner pipe assembly comprising a first inner pipe section and a second inner pipe section, and an inner joint between the first inner pipe section and second inner pipe section;
   an outer pipe assembly comprising a first outer pipe section and a second outer pipe section;
   a shroud containing the inner joint, wherein the shroud includes a recess therewithin, wherein the recess forms a contact area between the inner joint and the shroud that supports an end of the first inner pipe section and an end of the second inner pipe section and wherein the shroud mechanically connects the first outer pipe section to the second outer pipe section via a mechanical connection,
   a hatch fastened to the shroud by one or more fasteners and covering a hole in the shroud,
   wherein the hatch is moveable between a closed position and an open position to provide access to the inner joint through the hole, and
   wherein a connection between the second outer pipe section to the shroud is offset from the inner joint.

2. The fluid pipe connection of claim 1, characterised by the absence of a mechanical connection between the inner pipe assembly and the outer pipe assembly.

3. The fluid pipe connection of claim 1, wherein the hatch is detachable from the shroud.

4. The fluid pipe connection of claim 1, wherein the hatch is substantially planar.

5. The fluid pipe connection of claim 1, wherein the inner pipe assembly contains fluid at a temperature below-50 degrees C.

6. The fluid pipe connection of claim 1, wherein the inner pipe assembly contains gaseous hydrogen.

7. The fluid pipe connection of claim 1, wherein the inner pipe assembly contains a cryogenic liquid.

8. The fluid pipe connection of claim 7, wherein the cryogenic liquid is liquid hydrogen.

9. The fluid pipe connection of claim 1, wherein the inner joint is between the first inner pipe section, the second inner pipe section, and one or more additional inner pipe sections.

10. The fluid pipe connection of claim 1, wherein a pressure greater than standard atmospheric pressure is provided between the inner pipe assembly and the outer pipe assembly.

11. The fluid pipe connection of claim 10, wherein the pressure is greater than 150 kPa.

12. The fluid pipe connection of claim 1, comprising an inert gas between the inner pipe assembly and the outer pipe assembly.

13. The fluid pipe connection of claim 12, wherein the inert gas is nitrogen.

14. The fluid pipe connection of claim 1, wherein a vacuum pressure is provided between the inner pipe assembly and outer pipe assembly.

15. The fluid pipe connection of claim 1, wherein the shroud is releasably attached to the first outer pipe section and/or the second outer pipe section.

16. The fluid pipe connection of claim 1, wherein the inner joint between the first inner pipe section and second inner pipe section is formed by a mechanical clamp.

17. An aircraft fuel system comprising the fluid pipe connection of claim 1.

18. An aircraft comprising the aircraft fuel system of claim 17.

19. A method of disassembling the fluid pipe connection of claim 1, the method comprising:
   moving the hatch from the closed position to the open position to uncover the hole in the shroud; and
   accessing the inner joint via the hole to disassemble the inner joint.

20. A method of assembling the fluid pipe connection of claim 1, the method comprising:
   assembling the inner joint by coupling the first inner pipe section to the second inner pipe section; and
   moving the hatch from the open position to the closed position to cover the hole in the shroud.

* * * * *